(12) United States Patent
Schrag et al.

(10) Patent No.: US 7,448,196 B2
(45) Date of Patent: Nov. 11, 2008

(54) BALER WITH MULTI-AUGER PICKUP

(75) Inventors: Thomas G. Schrag, Hesston, KS (US);
Edward W. Esau, Hesston, KS (US);
Kurt Graber, Moundridge, KS (US);
Ryan A. Zecha, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 11/620,458

(22) Filed: Jan. 5, 2007

(65) Prior Publication Data
US 2008/0163600 A1  Jul. 10, 2008

(51) Int. Cl.
*A01D 39/00* (2006.01)
(52) U.S. Cl. .................................................. 56/341
(58) Field of Classification Search ........... 56/219–227, 56/341–364, 432–465; 100/145, 146, 337, 100/338
See application file for complete search history.

(56) References Cited

U.S. PATENT DOCUMENTS

| | | | | |
|---|---|---|---|---|
| 3,412,535 A | * | 11/1968 | Drummond | 56/14.4 |
| 4,106,268 A | * | 8/1978 | White et al. | 56/1 |
| 4,637,201 A | | 1/1987 | Pruitt et al. | |
| 5,326,320 A | | 7/1994 | von Allwoerden | |
| 5,842,335 A | * | 12/1998 | Esau | 56/341 |
| 5,979,153 A | * | 11/1999 | Roth | 56/341 |
| 6,058,688 A | | 5/2000 | Krambeck et al. | |
| 6,279,304 B1 | * | 8/2001 | Anstey et al. | 56/341 |
| 6,298,646 B1 | | 10/2001 | Schrag et al. | |
| 6,385,952 B1 | * | 5/2002 | Bergkamp et al. | 56/341 |
| 6,564,535 B1 | | 5/2003 | Nafziger et al. | |
| 6,601,375 B1 | | 8/2003 | Grahl et al. | |
| 6,651,418 B1 | * | 11/2003 | McClure et al. | 56/341 |
| 6,679,042 B1 | | 1/2004 | Schrag et al. | |
| 6,688,092 B2 | * | 2/2004 | Anstey et al. | 56/220 |
| 6,915,736 B2 | * | 7/2005 | Leupe et al. | 100/45 |
| 6,948,300 B1 | | 9/2005 | Bandstra et al. | |
| 7,204,074 B2 | * | 4/2007 | Bandstra et al. | 56/341 |
| 2005/0210855 A1 | * | 9/2005 | Bandstra et al. | 56/341 |

* cited by examiner

*Primary Examiner*—Thomas B. Will
*Assistant Examiner*—Joan D Misa
(74) *Attorney, Agent, or Firm*—Hovey Williams LLP (57) ABSTRACT

A hay baler provided with a tubular duct within which charges of crop material are prepared before being stuffed into the baling chamber has a windrow pickup device at its front end to lift crop materials off the ground as the baler advances. The effective operating width of the pickup is wider than the inlet to the duct so that the stream of crop materials lifted off the ground must be converged centrally into alignment with the inlet before entering the same. A pair of lower stub augers on opposite sides of the inlet are assisted by a pair of upper stub augers rotating in opposite directions relative to the lower augers to accomplish such convergence. A windguard overlies the incoming crop flow as well as the consolidation zone between left and right sets of the stub augers so as to maintain effective control over the flow at all times.

19 Claims, 10 Drawing Sheets

BALER WITH MULTI-AUGER PICKUP

RELATED APPLICATIONS

This application is related to contemporaneously filed application Ser. No. 11/620,469 filed Jan. 5, 2007, titled "Articulating Windguard for Agricultural Baler" and Ser. No. 11/620,394 filed Jan. 5, 2007, titled "Crop Pickup with Torsion Bar Flotation."

TECHNICAL FIELD

The present invention relates to hay balers of the type that make rectangular bales and, more particularly, to improvements in the pickup mechanism of such balers which lifts windrowed crop materials off the ground as the baler advances and directs it rearwardly into baling portions of the machine.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
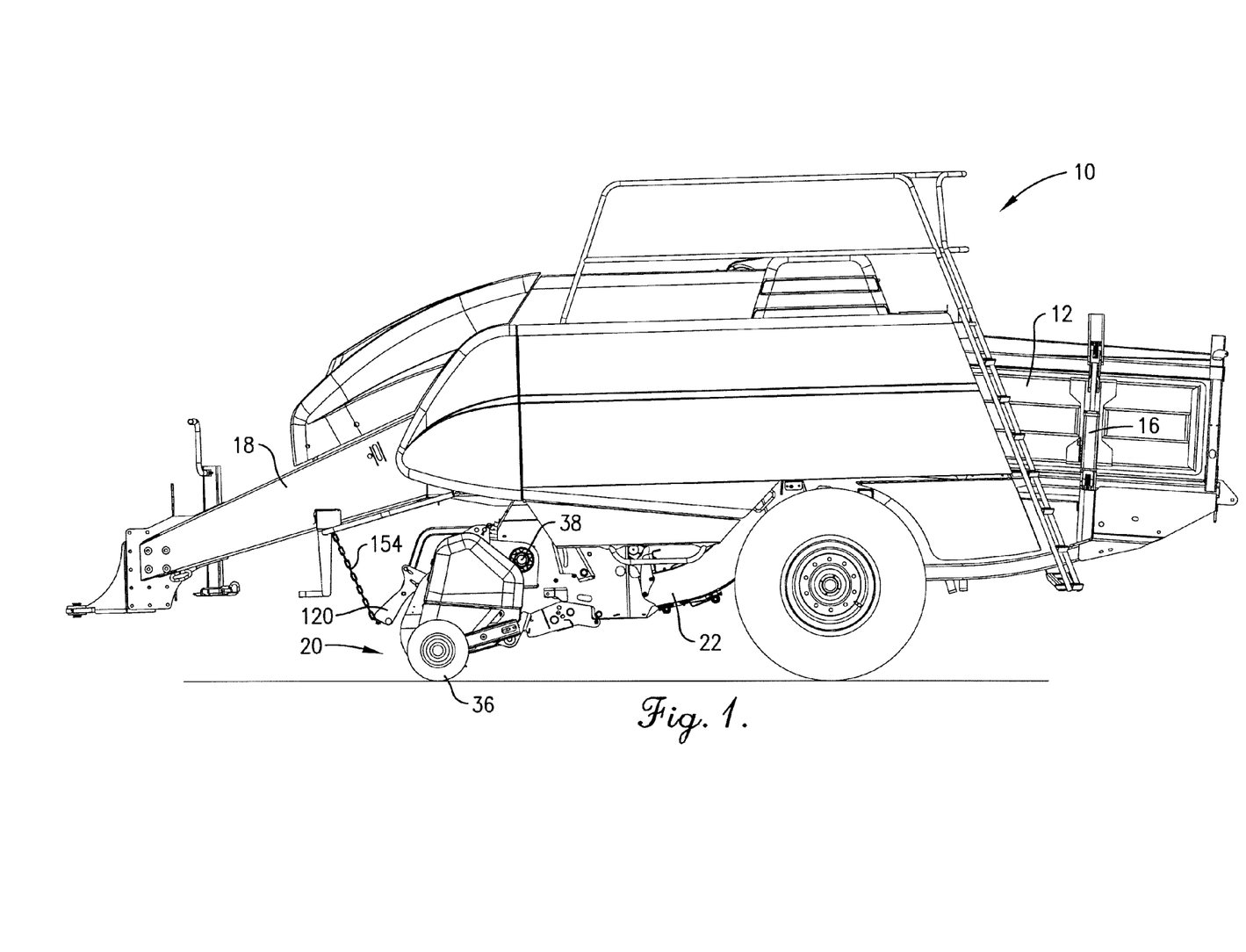
FIG. 1 is a left side elevational view of a baler capable of making rectangular bales and employing pickup mechanism constructed in accordance with the principles of the present invention.

The baler 10 as illustrated in FIG. 1 has a fore-and-aft extending baling chamber denoted generally by the numeral 12 within which bales of crop material are prepared. In the particular illustrated embodiment, baler 10 is an "extrusion" type baler in which the bale discharge orifice at the rear of the baler is generally smaller than upstream portions of the chamber such that the orifice restricts the freedom of movement of a previous bale and provides back pressure against which a reciprocating plunger 14 (FIG. 7) within the baler chamber 12 can act to compress charges of crop materials into the next bale. The dimensions of the discharge orifice and the squeeze pressure on the bales at the orifice are controlled by mechanism broadly denoted by the numeral 16 in FIG. 1. Baler 10 is hitched to a towing vehicle (not shown) by a fore-and-aft tongue 18, and power for operating the various mechanisms of the baler is supplied by the towing vehicle.

Baler 10 is an "in-line" type of baler wherein crop material is picked up below and slightly ahead of baling chamber 12 and then loaded up into the bottom of chamber 12 in a straight line path of travel as viewed in plan. A pickup broadly denoted by the numeral 20 is positioned under tongue 18 on the longitudinal axis of the machine, somewhat forwardly of baling chamber 12. A charge forming duct 22 extends generally rearwardly and upwardly from a point just behind pickup 20 to an opening 24 (FIG. 7) in the bottom of baling chamber 12. The plunger 14 reciprocates within chamber 12 in compression and retraction strokes across opening 24. When fully retracted, plunger 14 uncovers opening 24, and when fully extended, plunger 14 completely covers and closes off opening 24 with the rear face 14a of plunger 14 disposed somewhat rearwardly beyond the rear extremity of opening 24.

Duct 22 defines an internal passage 26 through which crop materials travel from pickup 20 to baling chamber 12 during operation of the machine. The front end of duct 22 is open to present an inlet 28 into passage 26, and an outlet for the duct is defined by the opening 24 into baling chamber 12. A top wall of duct 22 is defined by a series of laterally spaced apart straps 32 that extend downwardly and forwardly from baling chamber 12 and terminate in forwardmost upturned front ends 32a generally above inlet 28. The rear of pickup 20 has a centrally disposed discharge opening 31, in fore-and-aft alignment with inlet 28, that is formed by a pair of laterally spaced apart, left and right, concave rear wall portions 30a and 30b.

Pickup 20, in a preferred embodiment, has a pair of ground wheels 34 and 36 that support the pickup as the baler advances along the ground. Pickup 20 is preferably mounted to the chassis of baler 10 for pivoting movement about an upwardly and rearwardly disposed transverse pivot axis 38 (FIG. 1). Flotation for pickup 20 may be provided by a number of different flotation mechanisms including, for example, a torsion bar flotation system as disclosed in contemporaneously filed application Ser. No. 11/620,394 filed Jan. 5, 2007 and titled "Crop Pickup with Torsion Bar Flotation."

A relatively short, transversely channel-shaped chute 31 projects rearwardly from pickup opening 31 and is slidably received within the front end of duct 22. Chute 31 has a pair of sides and a floor, but no top, and serves as a telescoping transition piece between pickup 20 and duct 22 for crop flow as pickup 20 rises and falls over uneven terrain relative to duct 22 during operation.

Figure 7:
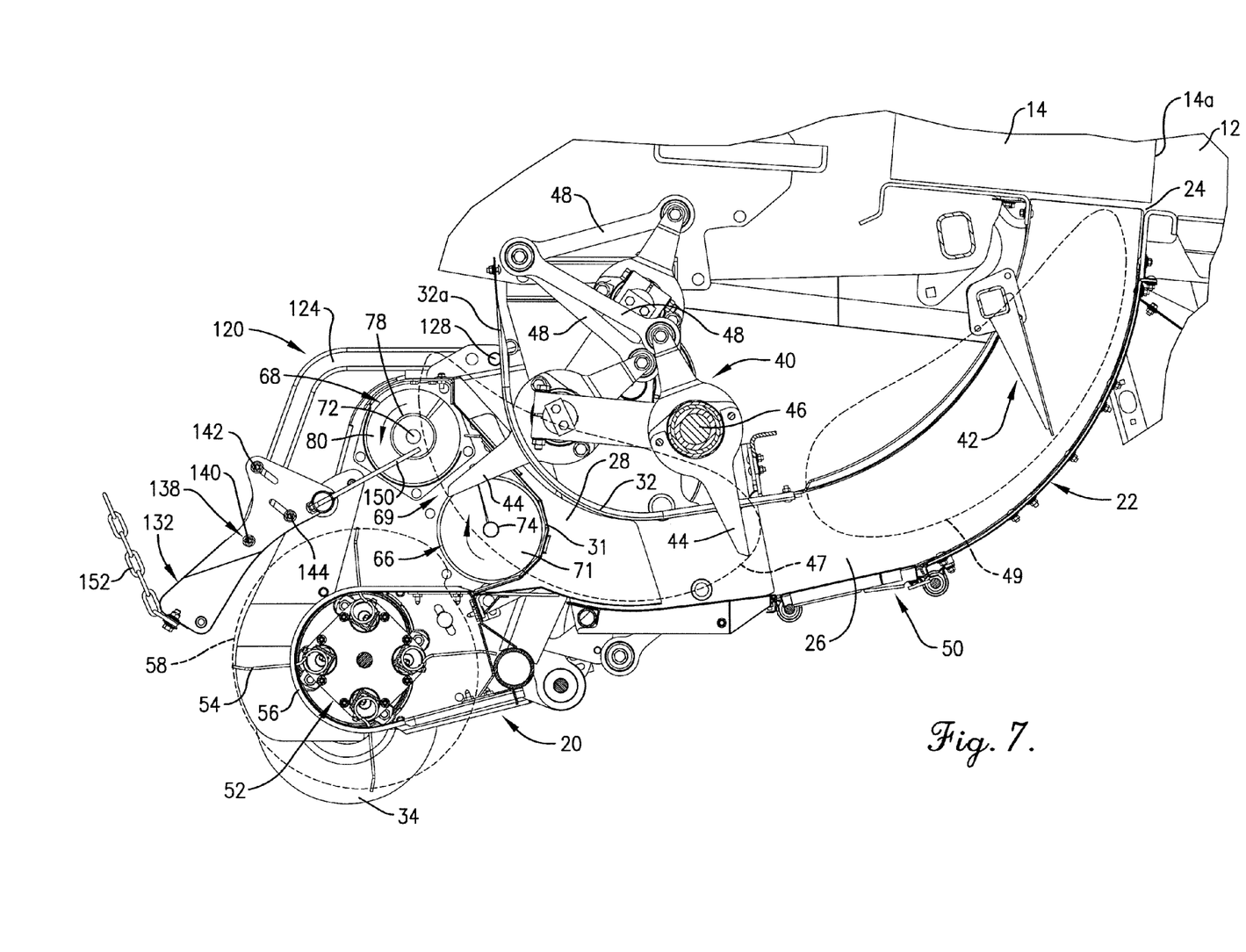
FIG. 7 is a fragmentary, longitudinal cross sectional view through the baler illustrating various working relationships between mechanisms of the baler.

Baler 10 further comprises feeding mechanism for moving crop materials through duct 22. Such feeding mechanism may, for example, comprise a suitable rotor associated with a cutter mechanism, or it may comprise other apparatus. In the illustrated embodiment, the feeding mechanism includes a packer broadly denoted by the numeral 40 and a stuffer broadly denoted by the numeral 42. As is conventional and well understood by those skilled in the art, packer 40 may include a plurality of packing forks 44 that are mounted along a crankshaft 46 and controlled by control links 48 for moving the tips of packing forks 44 in a generally kidney-shaped path of travel 47 as illustrated in FIG. 7. Packer 40 is thus used to receive materials from pickup 20 and pack the same into duct 22 for preparing a precompressed, preshaped charge of crop materials that conforms generally to the interior dimensions of duct 22 while opening 24 is closed by the reciprocating plunger 14. The stuffer 42, as is conventional and well understood by those skilled in the art, functions to sweep through its own kidney shaped path of travel 49 as illustrated in FIG. 7 to sweep the prepared charge up into baling chamber 12 between compression strokes of plunger 14 when opening 24 is uncovered. A conventional density control mechanism broadly denoted by the numeral 50 in the floor of duct 22 functions in a manner well understood by those skilled in the art to check the density of each charge forming within duct 22 and to cause the stuffer 42 to pause in the event that a charge having predetermined characteristics has not accumulated within duct 22 by the next time stuffer 42 would normally sweep the charge up into the baling chamber 12. As above noted, these principles of operation are well understood by those skilled in the art and are disclosed, for example, in prior U.S. Pat. No. 4,106,268, which is hereby incorporated by reference into the present specification.

Pickup 20 includes a retracting tine rotor 52 of conventional construction wherein rake tines 54 sweep upwardly along the front of the portion of rotor 52, rearwardly at the top portion of rotor 52, and then downwardly along the rear portion thereof. Such tines 54 project through slots defined between wrapper straps 56 that are looped around the front of rotor 52. Tines 54 are subject to cam-action such that their outer tips follow the path of travel indicated by the phantom lines 58 in FIG. 7, thereby remaining generally radial throughout their path of travel except along the rear stretch thereof where the tines retract straight down between straps 56 while disposed in an upright condition to release the crop material.

As is apparent, the effective operating width of pickup 20 is wider than inlet 28 into duct 22. Thus, pickup 20 is operable to pick up windrows of crop material that are substantially wider than inlet 28. However, this also means that outboard portions of the crop inflow located in front of rear wall portions 30a, 30b must be consolidated centrally before entering duct 22.

For this purpose, two sets of upper and lower consolidating stub augers are provided on opposite outboard sides of inlet 22 in front of rear wall portions 30a, 30b. A left set of stub augers in front of rear wall portion 30b comprises a lower stub auger 62 and an upper stub auger 64. Similarly, a right set of stub augers in front of rear wall portion 30a comprises a lower stub auger 66 and an upper stub auger 68. All four of the stub augers 62-68 are cantilever-mounted, supported at their outboard ends by frame structure of the pickup 20 and unsupported at their inboard ends. The inboard ends of left stub augers 62, 64 are laterally spaced from the inboard ends of right stub augers 66, 68 so as to define an open space therebetween in front of opening 31 and inlet 28 that serves as a consolidated crop delivery zone 69.

Lower stub augers 62 and 66 terminate with their inboard ends in fore-and-aft alignment with the corresponding outer edges of discharge opening 31 and inlet 28, while upper stub augers 64 and 68 are somewhat longer than lower stub augers 62, 66 and slightly overhang or overlap the corners of opening 31 and inlet 28. In a preferred embodiment, the inboard ends of upper stub augers 64, 68 terminate just short of the path of travel 47 of corresponding outboard packing forks 44. It will also be noted that upper stub augers 64 and 68 have their axes of rotation disposed somewhat forwardly of the axes of rotation of lower stub augers 62, 66. In a most preferred embodiment, lower stub augers 62, 66 are axially aligned with one another, while upper stub augers 64, 68 are likewise axially aligned with one another, although this is not absolutely required. The common axis of rotation thus presented by lower stub augers 62, 66 is designated by the numeral 70 in FIG. 7, while the common axis of rotation presented by upper stub augers 64, 68 is designated by the numeral 72 in that same figure.

Each of the lower stub augers 62, 66 is designed to rotate in a clockwise direction viewing FIG. 7 so that the front portion thereof is moving upwardly during operation. On the other hand, each of the upper stub augers 64, 68 is designed to rotate in a counterclockwise direction viewing FIG. 7 such that the front portion of those augers is rotating downwardly during operation. Although upper stub augers 64, 68 are offset forwardly from lower stub augers 62, 66, there is very little vertical clearance between the lower and upper augers; that is, the bottom extremities of the upper stub auger 64, 68 are at substantially the same elevation as the upper extremities of the lower stub augers 62, 66 such that clearance between the two is obtained primarily because of the forward offset of the upper stub augers 64, 68 relative to the lower stub augers 62, 66.

Each of the lower stub augers 62, 66 has a central tubular core 74 and flighting 76 wound helically around and affixed to core 74. Similarly, each upper stub auger 64, 68 has a tubular core 78 about which is wound helical flighting 80. Flighting 76 and 80 is so oriented, considering the direction of rotation of the stub auger with which it is associated, that the flighting tends to feed materials inwardly toward the center of the machine, i.e., toward consolidating zone 69. It will be noted that core 70 of each lower stub auger 62, 66 is substantially smaller in diameter than core 78 of each upper stub auger 64, 68. In fact, core 70 is on the order of one-third the diameter of core 78. Although the outer diameters of upper and lower stub augers are substantially the same (upper stub augers 64, 68 are slightly smaller in total diameter than lower stub augers 62, 66), flighting 76 on the lower stub augers is deeper than the flighting 80 on the upper stub augers 64, 68.

The front periphery of each lower stub auger 62, 66 is located as close as possible to the path of pickup tine travel 58 as illustrated in FIG. 7 so as to minimize the distance over which inflowing crop is uncontacted by mechanical feeding means of one kind or another. In this respect, it will also be seen from FIG. 7 in particular that the path of travel of the packing forks 44 is such that along the front stretch of their travel they begin at a point above the stub augers and consolidating zone 69 and then sweep downwardly through the consolidating zone forwardly of inlet 28 before sweeping rearwardly through duct 22 for a significant distance. Along the front stretch of their movement through zone 69, the tips of forks 44 sweep downwardly behind the axis 72 of upper stub augers 64, 68 and in front of the axis of rotation 74 of lower stub augers 62, 66.

Figure 5:
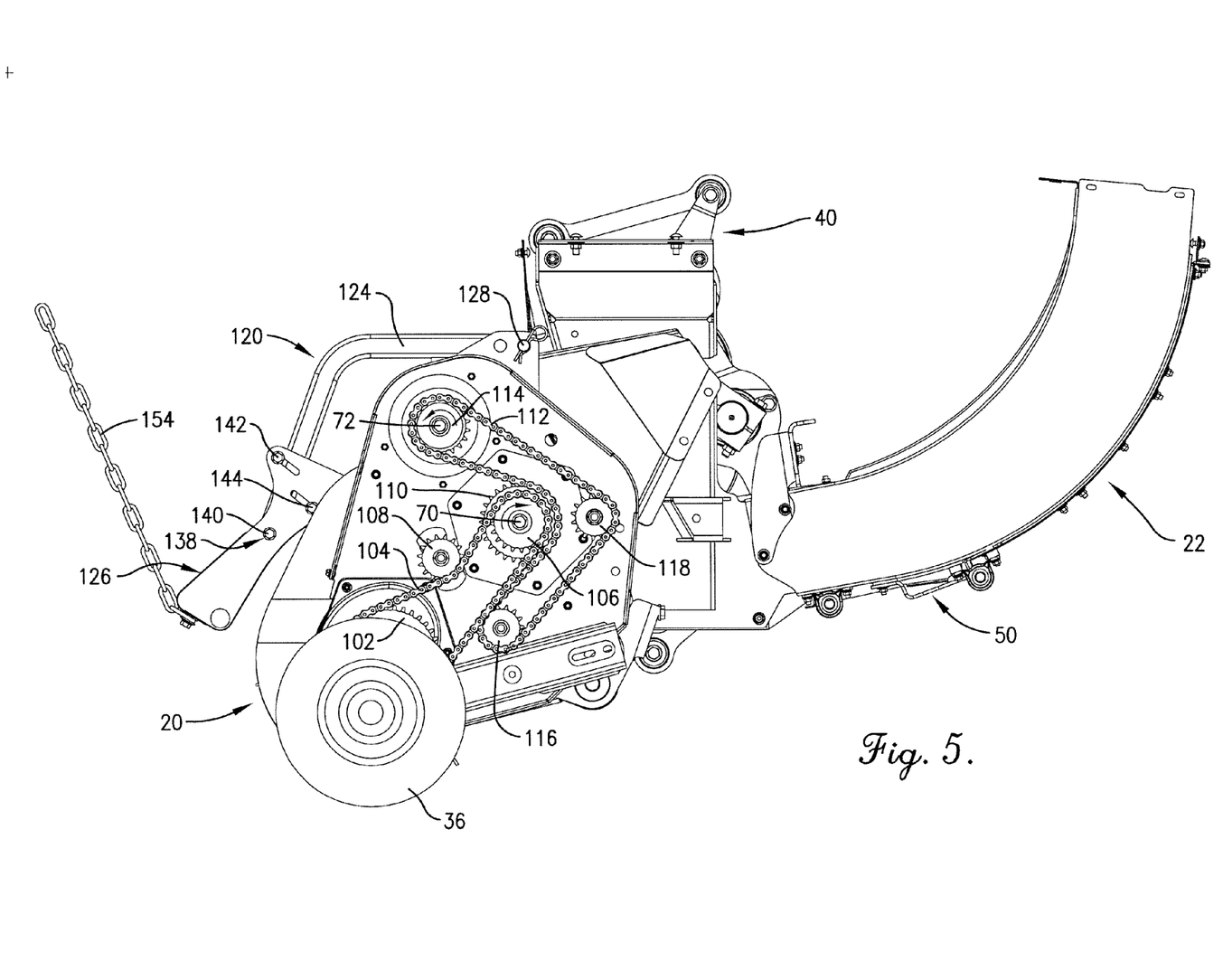
FIG. 5 is a left side elevational view of the pickup and charge forming duct.
Figure 6:
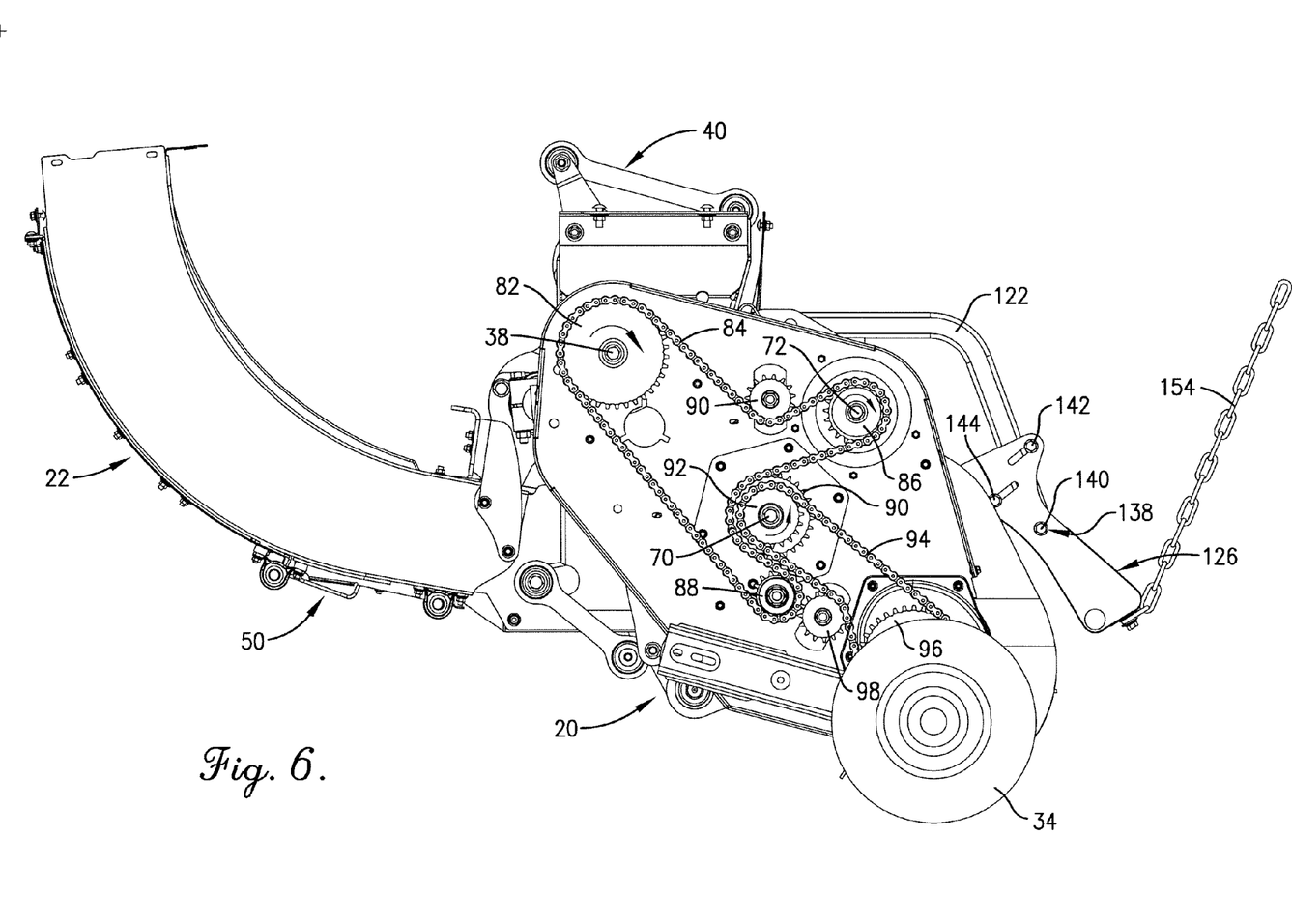
FIG. 6 is a right side elevational view of the pickup and charge forming duct.

Driving power for the operating components of pickup 20 is supplied thereto through drive means best shown in FIGS. 5 and 6. As illustrated in FIG. 6, a large sprocket 82 on the right side of pickup 20 supplies driving power to the other sprockets and their associated shafts on that side of the machine. Input driving power to sprocket 82 is supplied by conventional means not shown but well understood by those ordinarily skilled in the art. Sprocket 82 rotates clockwise during operation as viewed in FIG. 6 and is entrained by a drive chain 84 that is also wrapped around a sprocket 86 associated with upper stub auger 68 and a lower idler sprocket 88. Chain 84 is also backwrapped around a sprocket 80 associated with lower stub auger 66 for driving the same in a counterclockwise direction viewing FIG. 6, and a tensioning sprocket 90 engages 84 in the slack stretch between drive sprocket 82 and driven sprocket 86. Sprocket 90 is part of a double sprocket, the other half being presented by an outer sprocket 92 on the same axis 70 as sprocket 90. A chain 94 is entrained around sprocket 92 as well as around a lower driven sprocket 96 that provides driving power to the retracting tine finger rotor 52. A tensioning sprocket 98 engages the slack side of chain 94 to maintain appropriate tension within the latter.

The driven sprocket 96 on the right side of pickup 20 is fixed to the drive shaft 100 of pickup tine rotor 52 (FIG. 7) which, in turn, is fixed to another sprocket 102 on the left side of the machine as illustrated in FIG. 5. Sprocket 102, in turn, is entrained by a chain 104 looped around the outer sprocket 106 of a double sprocket associated with the axis of rotation 70 of the lower stub augers. A tensioning sprocket 108 tensions the slack side of chain 104. An inner sprocket 110 of the double sprocket associated with axis 70 is backwrapped by a chain 112 that is also looped around an upper driven sprocket 114 associated with the axis of rotation 72 of upper stub augers 64, 68, and a lower idler sprocket 116. A second idler sprocket 118 is also entrained by chain 112. Preferably, although not required, the inner sprockets 90 and 110 associated with lower stub augers 62, 66 are somewhat larger in diameter than upper sprockets 86, 114 associated with upper stub augers 64, 68. Therefore, upper stub augers 64, 68 rotate slightly faster than lower stub augers 62, 66. This concept of having an upper, down-turning auger rotating faster than a lower, upturning auger is disclosed in prior U.S. Pat. No. 6,679,042 owned by the assignee of the present invention. The '042 patent is hereby incorporated by reference into the present specification.

Figure 2:
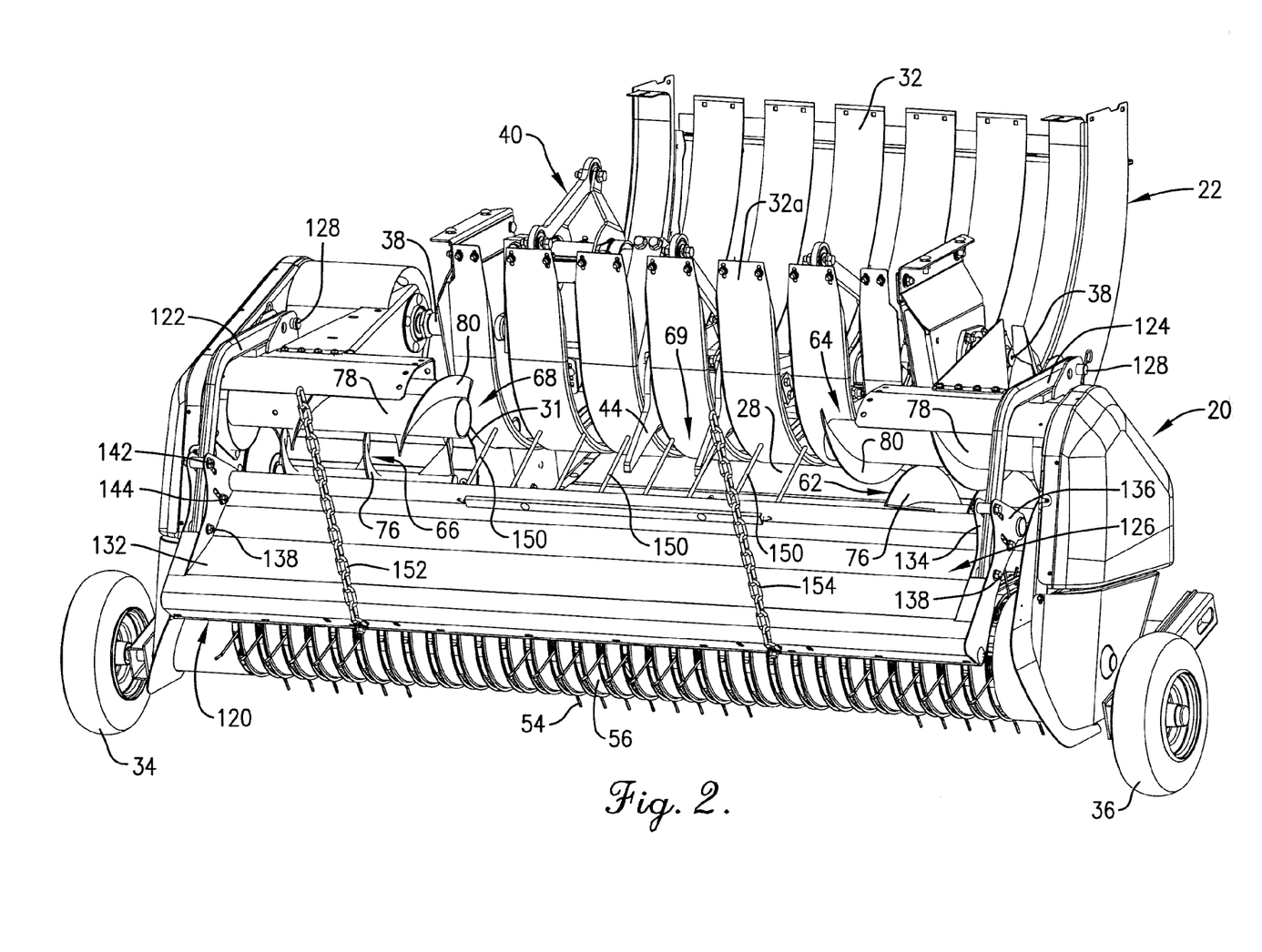
FIG. 2 is a left, front isometric view of the pickup and charge forming duct of the machine isolated and removed from the rest of the baler to reveal details of construction.
Figure 3:
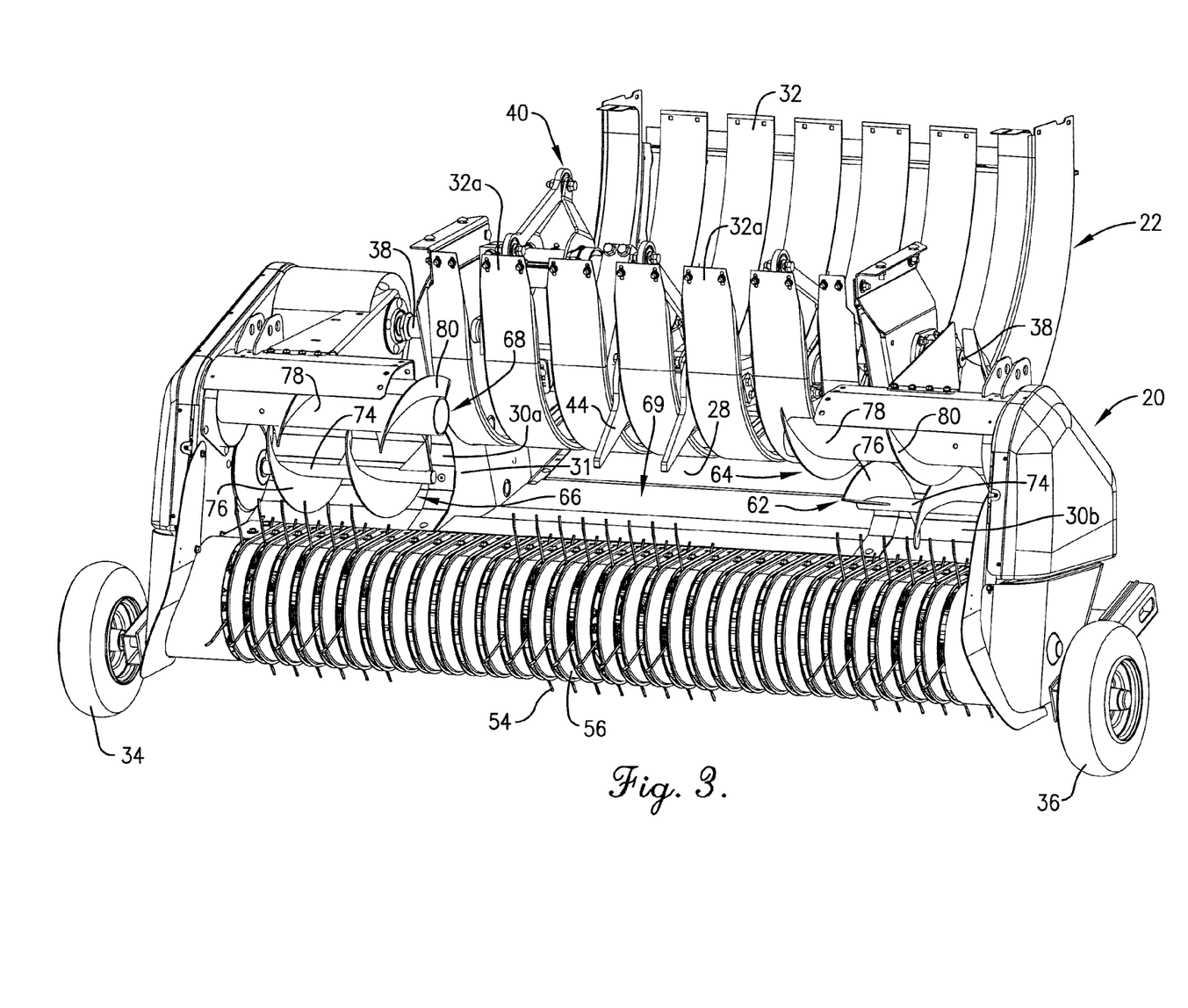
FIG. 3 is a left front isometric view of the pickup similar to FIG. 2 but with the windguard removed to reveal details of construction.
Figure 4:
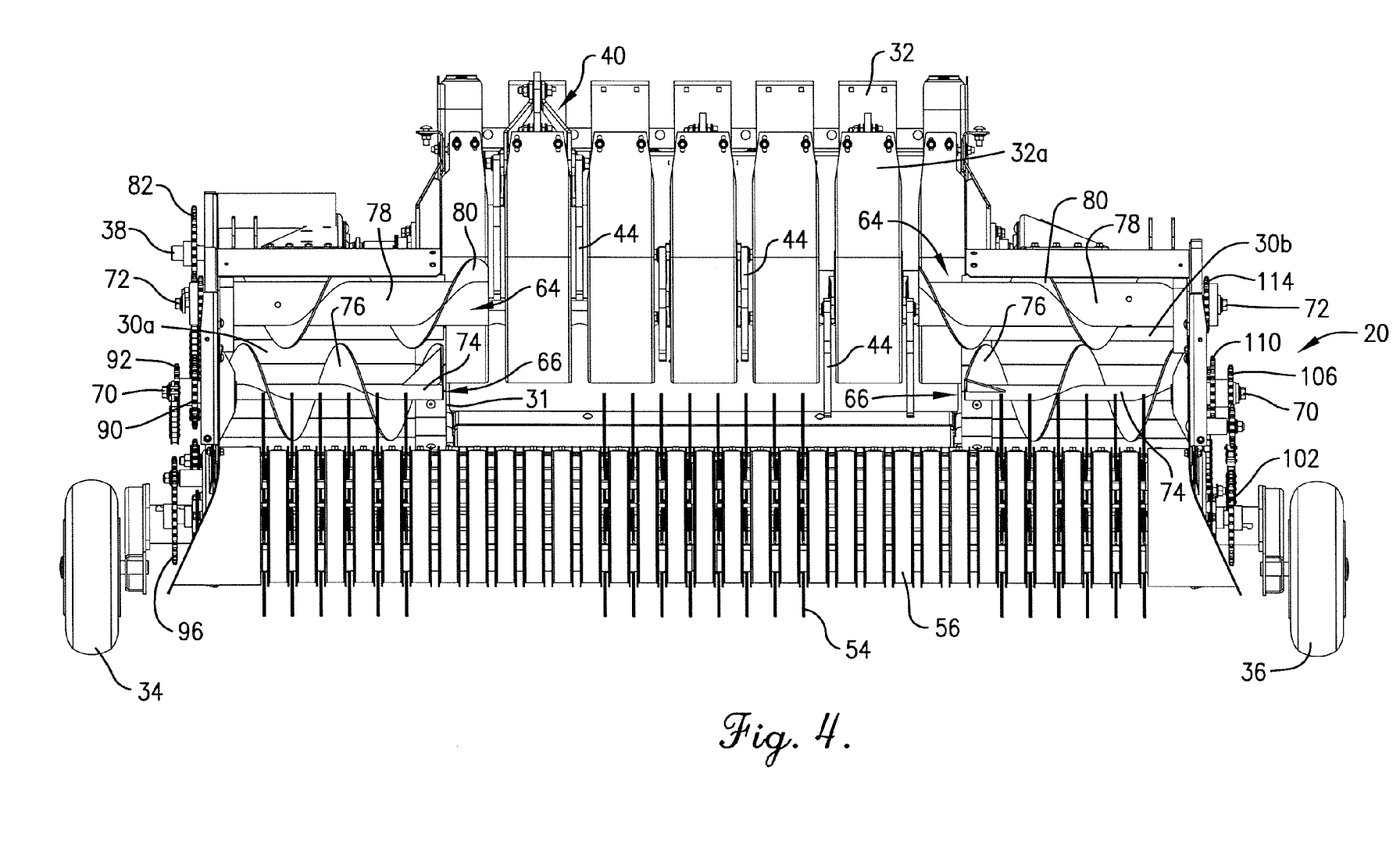
FIG. 4 is a front elevational view of the pickup and charge forming duct with the windguard removed.

Pickup 20 also includes a windguard 120 that is disposed to overlie and control the flow of crop materials as they are picked up by tine rotor 52 and directed toward duct 22. In one preferred form of the invention, the windguard 120 includes a pair of inverted, generally L-shaped support arms 122 and 124 as well as a transversely extending, elongated crop holddown device 126 supported by arms 122, 124 at the lower, front ends thereof. The upper rear ends of arms 122, 124 are pivotally attached to the chassis of pickup 20 at the top thereof by horizontally extending pivot pins 128 such that arms 122, 124 are adapted for up and down swinging movement. Stop blocks 130 (FIG. 9) constructed of synthetic resinous material or the like are attached to the bottom edges of arms 122, 124 for engaging adjacent portions of the pickup chassis and limiting downward swinging movement of arms 122, 124. Arms 122, 124 are shown in their fully lowered positions in FIG. 2.

In a preferred embodiment, hold down device 126 comprises a solid, slightly bowed body or panel 132 presenting a slightly concave underside that generally conforms to the path of travel of the inflowing crop material. Hold down device 126 could take other forms as well. For example, panel 132 could be perforated or could comprise a series of laterally spaced, fore-and-aft extending tines or rods. Furthermore, in preferred form panel 132 is attached to arms 122, 124 for articulating movement relative to arms 122, 124.

Figure 8:
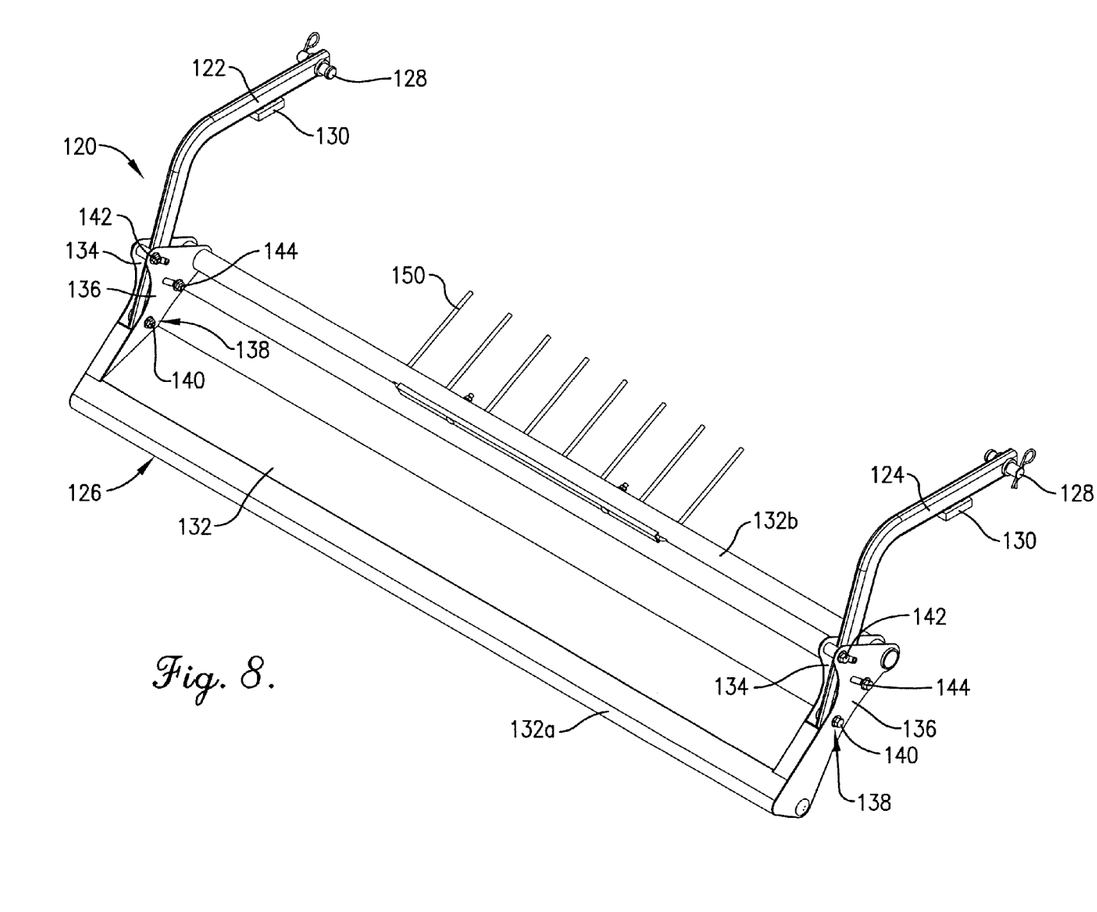
FIG. 8 is a left front isometric view of the windguard.
Figure 9:
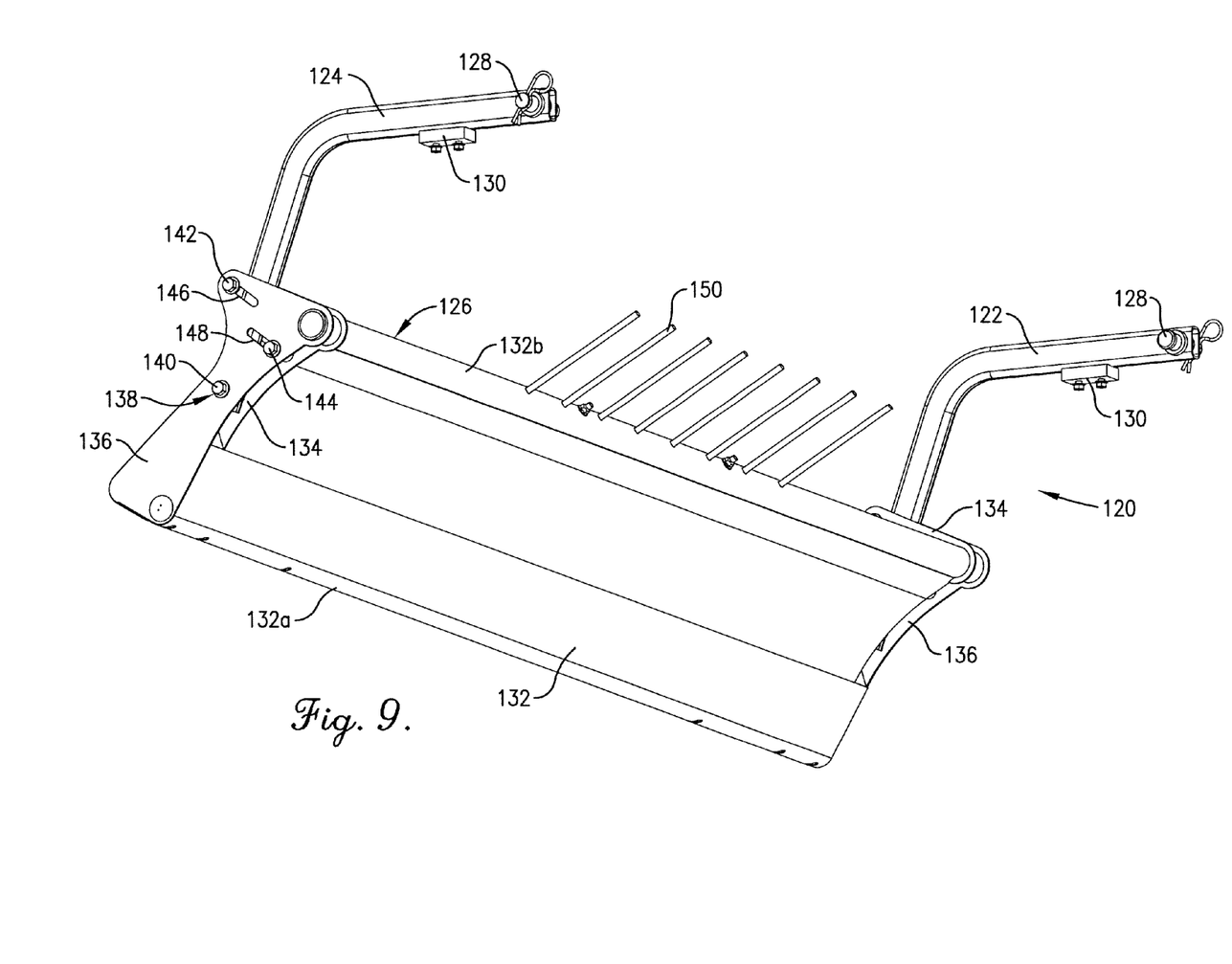
FIG. 9 is a left rear isometric view of the windguard looking upwardly from below the windguard.
Figures 10, 11:
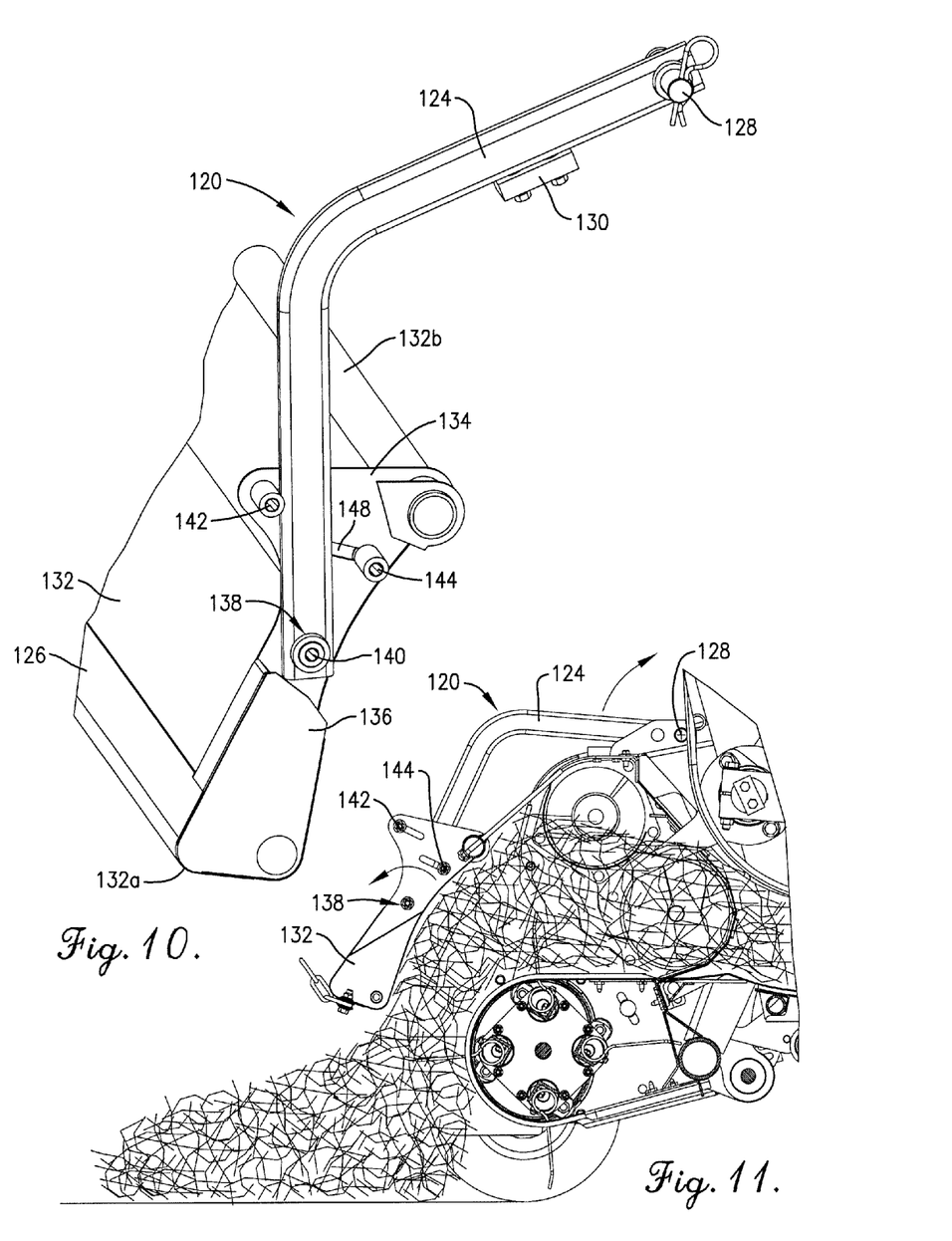
FIG. 10 is an enlarged, fragmentary left isometric view of the windguard with one end panel thereof partially removed to reveal internal details of construction.
FIG. 11 is a fragmentary, longitudinal cross-sectional view through the baler similar to FIG. 7 but illustrating how the hold down panel of the windguard may articulate relative to the support arms to provide relief during heavy crop inflow.

To this end, as shown particularly in FIGS. 8, 9 and 10, panel 132 has a pair of laterally spaced end plates 134, 136 at each end thereof. A gap is defined between each pair of end plates 134, 136, and the forward end of the corresponding arm 122 or 124 is received within such gap. Each arm 122, 124 is attached to the corresponding left or right end of panel 132 by a loose pivotal connection 138 that includes a transverse pivot bolt 140. Pivot bolt 140 is located approximately midway between the front end 132a of panel 132 and the rear end 132b thereof so that panel 132 can rock or oscillate about pivots 140 generally in fore-and-aft directions.

Because pivot connections 138 are loose connections, one end of panel 132 can be raised and lowered relative to the other end thereof, within certain limits. Thus, to a certain extent, the opposite ends of panel 132 can be raised and lowered independently of one another to accommodate uneven crop flow as hereinafter explained in more detail. As an alternative to the loose pivotal connections 138, ball joints could be provided.

Each pair of end plates 134, 136 is provided with a pair of transverse stop bolts 142 and 144 for limiting articulation of panel 132 relative to arms 122, 124. The fore-and-aft spacing between stop bolts 142 and 144 can be adjusted by virtue of the fact that bolts 142, 144 pass through elongated slots 146, 148 in end plates 134, 136. The center of gravity of panel 132 is such that panel 132 is biased in a clockwise direction viewing FIGS. 7, 9 and 10, for example, so that stop bolts 142 normally bear against the front edges of arms 122, 124. However, panel 132 can be forcibly pivoted counterclockwise about pivot bolts 140 until the opposite stop bolts 144 come into engagement with the rear side of arms 122, 124.

Hold down device 126 further includes a set of laterally spaced apart tine fingers 150 projecting rearwardly from the panel 132 at the rear edge thereof. The series of tine fingers 150 is located in fore-and-aft alignment with, and projects rearwardly into, the consolidating zone 69, there being none of such fingers in front of the stub augers 62-68. As illustrated in FIG. 7, tine fingers 150 project rearwardly to a point just below the axis 72 of top stub augers 64, 68 and are generally disposed in the same plane as the panel 132 so as to serve as a continuation thereof in the critical center consolidating zone 69. Tine fingers 150 thus serve to hold down and control crop flow in that area.

The front end of windguard 120 is connected via a pair of limit chains 152 and 154 to the underside of tongue 18. The length of limit chains 152, 154 can be adjusted as need be to suit particular crop conditions. Chains 152, 154 serve to help limit the amount of downward swinging of arms 122, 124.

OPERATION

As the baler 10 advances through the field, windrowed crop materials are picked up by pickup 20 and delivered into inlet 28 of duct 22. Packer 40 takes the picked up materials from pickup 20 and feeds them rearwardly into the duct 22 to form precompressed and preshaped charges of material that are stuffed up into the bale chamber 12 during successive stuffing strokes of stuffer 42. In a most preferred embodiment, a set of retaining fingers (not shown) are provided on the backside of duct 22 near the top thereof for retaining the charge against premature movement up into the baling chamber 12. Such fingers are withdrawn from the duct just before each stuffing stroke of the stuffer 42, all as well understood by those skilled in the art. Retaining fingers of this type are disclosed, for example, in the previously incorporated U.S. Pat. No. 4,106, 268. The density control mechanism 50 causes stuffer 42 to dwell for one or more successive stuffing strokes in the event the charge accumulating within duct 22 has not reached the shape and density desired for the charge by the time stuffer 42 would normally begin its next stuffing stroke. The retaining fingers keep the top portion of the charge from slipping up into the baling chamber when stuffer 42 dwells and opening 24 is uncovered by plunger 14.

As the crop materials are engaged by pickup tines 54 and fed upwardly and rearwardly under windguard 120, the central portion of the crop flow moves directly into the consolidation zone 69 where it is engaged by the packing forks 44 and swept rearwardly into duct 22. On the other hand, laterally outboard portions of the crop flow encounter the stub augers 62-68 and are converged centrally into the consolidation zone 60 where they can be acted upon by packing forks 44. It is important in this respect to keep the flow of crop materials moving at all times as they transition from pickup tines 54 to packer forks 44, and the stub augers 62, 68 are instrumental in causing this to occur.

Using the lower stub augers 62, 66 alone has been found to present problems in certain conditions. For example, in light, fluffy straw, the crop flow has a tendency to boil up and accumulate on top of the lower stub augers 62, 66 if upper stub auger 64, 68 are not present. By adding upper stub augers 64, 68, and rotating them counterclockwise viewing FIG. 7 so that their front portions move downwardly and generally toward lower stub augers 62, 66, the crop material is better confined at the top and is forced downwardly into operating engagement with lower stub augers 62, 66. Of course, at the same time, flighting 80 on upper stub augers 64, 68 is moving the crop materials inwardly toward the consolidation zone 69 where they can be acted upon by packing forks 44. This can have a significant impact on throughput of the baler, and certainly reduces the likelihood of plugging the baler in the area of pickup 20.

It is also been found that having two stub augers 64, 68 at the top rather than a single continuous auger across the top provides more room for bulky material immediately in front of inlet 28 as there is less of a restriction to crop flow in that region. It also provides clearance for packing forks 44 to reach forwardly out into the mass of crop materials from above the same and to sweep downwardly therethrough, taking high capacity bites out of the mass of materials present in that area. It should be noted that by having the packing forks 44 reach upwardly above upper augers 64, 68 before sweeping downwardly through consolidating zone 69, forks 44 do not shove or push the materials forwardly in a counterproductive motion. Instead, one or more of the forks is continuously reaching down from above the crop stream and grabbing materials to move them smoothly rearwardly into the interior of duct 22.

Offsetting the upper stub augers 64, 68 forwardly of lower stub augers 62, 66 is helpful in maintaining control over crop material tending to bunch up and merely accumulate on lower stub augers 62, 66. The sooner the outboard incoming material can be engaged by the downturning top stub augers 64, 68, the sooner it can be contained and controlled for best results.

The special windguard 120 is also helpful in maintaining control over the inflowing stream of crop materials. In the event that a large bunch of materials flows up under panel 132, the windguard can readily swing upwardly away from pickup tines 54 to accommodate such extra materials. As the heavy flow then encounters tines 150, panel 132 can pivot counterclockwise about pivots 140 to provide relief in an upward direction under tines 150 as illustrated in FIG. 11. This relief is particularly important because, in addition to the heavy bunch of materials entering consolidating zone 69, the consolidating zone 69 is constantly receiving its usual heavy flow of materials from the two outboard regions of the pickup as stub augers 62-68 converge the outboard materials centrally. It will be noted that the extent of such articulating relief motion can be controlled by adjusting the positions of the stop bolts 142, 144 as previously explained.

It will also be noted that tines 150 provide an effective top confinement means for the crop flow in the consolidation zone yet do not interfere with the packing forks 44. Forks 44 sweep downwardly between tines 150 such that materials within consolidation zone 60 are perfectly positioned to be engaged and controllably acted upon by the moving forks 44.

Of course, it is also important to note that windguard panel 132 has significant freedom of movement in a variety of directions as the crop flow is moving beneath panel 132. Thus, if a large bunch of material is picked up along one side of the pickup relative to the other, one corner of panel 132 can readily lift relative to other corners as need be to accommodate the uneven distribution of materials within the crop flow. The looseness of pivots 140 is instrumental in allowing this flexibility.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a rectangular baler having a fore-and-aft, generally horizontally extending baling chamber, a plunger reciprocable within said chamber in compression and retraction strokes, and an opening in the bottom of the baling chamber through which charges of crop material are introduced into the chamber between compression strokes of the plunger, the improvement comprising:

a pickup for lifting crop materials off the ground as the baler advances;

structure defining a passage leading from the pickup to the opening in the bottom of the baling chamber, said passage including an inlet for receiving materials from the pickup; and feeding mechanism adjacent said inlet for moving crop materials within the passage, said inlet being transversely narrower than the effective operating width of the pickup, said pickup including a pair of transversely extending and axially spaced apart lower stub augers positioned on opposite lateral sides of said inlet and disposed forwardly thereof for consolidating picked up crop materials centrally toward the inlet from opposite, laterally outboard areas of the pickup during rotation of the lower stub augers, said pickup further including a pair of transversely extending and axially spaced apart upper stub augers positioned on opposite lateral sides of said inlet above the lower stub augers, said upper stub augers being configured to consolidate crops centrally during rotation of the upper stub augers, said upper and lower stub augers cooperating to define a crop consolidation zone in front of said inlet and between inboard ends of the upper and lower stub augers, said feeding mechanism including a portion that is operable to reach forwardly beyond said inlet into said crop consolidation zone along a path of travel that overlaps the cross-sectional outline of the upper and lower stub augers when viewed in side elevation for feeding crop materials rearwardly through the inlet and into the passage.

2. In a baler as claimed in claim 1, said lower stub augers being driven in such a direction that front portions of the stub augers move generally upwardly and rearwardly during operation, said upper stub augers being counter-rotated relative to the lower stub augers such that front portions of the upper stub augers move generally downwardly and rearwardly during operation.

3. In a baler as claimed in claim 1,
said feeding mechanism comprising a packer operable to pack crop materials within said passage,
said portion of the feeding mechanism including at least one packing fork.

4. In a baler as claimed in claim 3,
said at least one packing fork being operable to sweep downwardly and rearwardly through the consolidation zone from a point located above the axes of rotation of the upper stub augers.

5. In a baler as claimed in claim 4,
said at least one packing fork having a tip that passes behind the axes of rotation of the upper stub augers and in front of the axes of rotation of the lower stub augers as the fork sweeps through the consolidation zone.

6. In a baler as claimed in claim 1,
the axes of rotation of the upper stub augers being disposed above and forwardly of the axes of rotation of the lower stub augers.

7. In a baler as claimed in claim 1,
said upper stub augers rotating slightly faster than the lower stub augers.

8. In a baler as claimed in claim 1,
said upper and lower stub augers each having an elongated central core and flighting wrapped helically around said core along the length thereof,
said core of the upper stub augers having a larger diameter than the core of the lower stub augers.

9. In a baler as claimed in claim 1,
said feeding mechanism comprising a packer operable to pack crop materials within said passage and a stuffer separate from said packer and operable through periodic loading cycles to load a charge from the packer up into the baling chamber.

10. In a baler as claimed in claim 9,
said stuffer having control mechanism operably associated therewith for temporarily deactivating the stuffer in the event a charge accumulating in the passage has failed to reach a predetermined density by the start of the next loading cycle of the stuffer.

11. In a baler as claimed in claim 1,
further comprising a windguard disposed in front of said consolidation zone above the pickup,
said windguard including a hold down device and support structure adapted to position said hold down device in overlying relationship to a flow of crop materials entering the baler,
said support structure being movable up and down with the hold down device to accommodate the flow of crop materials beneath the hold down device, and said hold down device being pivotally connected to said support structure to permit the hold down device to pivot up and down relative to the support structure to accommodate changes in the crop flow.

12. In a baler as claimed in claim 11,
said windguard including a pair of laterally spaced, fore-and-aft extending arms generally adjacent opposite outboard ends of the pickup and pivotally supported at their rear ends for up and down swinging movement,
said windguard further including a crop hold down device spanning said arms and movable therewith during up and down motion of the arms,
said hold down device being pivotally connected to said arms in a manner to permit the hold down device to pivot relative to the arms about a transverse axis.

13. In a baler as claimed in claim 11,
said hold down device comprising a solid panel.

14. In a baler as claimed in claim 11,
said hold down device having a front and a rear,
said support structure being pivotally connected to said hold down device at points disposed intermediate said front and rear of the hold down device.

15. In a baler as claimed in claim 14,
said hold down device having a pair of limit stops disposed to limit the extent of pivoting movement of the hold down device in opposite directions relative to the support structure.

16. In a baler as claimed in claim 15,
said hold down device having its center of gravity so located relative to said axis of pivoting movement of the hold down device that the rear of the hold down device is gravity biased downwardly.

17. In a baler as claimed in claim 14,
said windguard further comprising a plurality of laterally spaced tines projecting rearwardly from the hold down device into said consolidating zone.

18. In a baler as claimed in claim 11,
said support structure comprising a pair of laterally spaced apart arms,
said hold down device spanning said arms,
the pivotal connection of the hold down device to the arms being such that one of the arms can be raised and lowered relative to the other within predetermined limits.

19. In a baler as claimed in claim 18,
the pivotal connection of the hold down device to the arms being effected through a pair of loose pivot assemblies at opposite lateral ends of the hold down device,
each of said pivot assemblies including a transversely extending pivot.

* * * * *